United States Patent [19]

McAllister et al.

[11] Patent Number: 5,586,171

[45] Date of Patent: Dec. 17, 1996

[54] SELECTION OF A VOICE RECOGNITION DATA BASE RESPONSIVE TO VIDEO DATA

[75] Inventors: Alex McAllister, Wheaton; Frank Cheston, Potomac; David E. Young; John P. Hanle, both of Silver Spring, all of Md.

[73] Assignee: Bell Atlantic Network Services, Inc., Arlington, Va.

[21] Appl. No.: 271,884

[22] Filed: Jul. 7, 1994

Related U.S. Application Data

[63] Continuation-in-part of Ser. No. 271,885, Jul. 7, 1994, Pat. No. 5,553,119, and Ser. No. 271,887, Jul. 7, 1994.

[51] Int. Cl.$^6$ .................... A61B 5/04; H04M 11/06
[52] U.S. Cl. ................... 379/67; 379/201; 379/207; 340/825.3; 340/825.34
[58] Field of Search ........................ 379/201, 207, 379/88, 67, 188, 189, 196, 198, 199; 340/825.3, 825.31, 825.33, 825.34, 825.35

[56] References Cited

U.S. PATENT DOCUMENTS

| | | | |
|---|---|---|---|
| 3,617,016 | 11/1971 | Bolsey | 244/3.16 |
| 3,742,938 | 7/1973 | Stern | 128/2.05 |
| 3,764,270 | 10/1973 | Collier et al. | |
| 3,809,067 | 3/1974 | Hoppesch | 128/2 |
| 3,842,345 | 10/1974 | Padgitt et al. | 324/71 |
| 3,870,035 | 3/1975 | Sarnoff | 128/2.05 |
| 3,885,090 | 5/1975 | Rosenbaum | 178/6.6 |
| 3,903,726 | 9/1975 | Hirosawa et al. | 73/23 |
| 3,972,703 | 1/1976 | Bolsey | 178/6.8 |
| 3,988,533 | 10/1976 | Mick et al. | 178/6.8 |
| 4,093,945 | 6/1978 | Collier et al. | 340/279 |
| 4,337,377 | 6/1982 | Van Riper et al. | |
| 4,458,266 | 7/1984 | Mahoney | 358/105 |
| 4,458,693 | 7/1984 | Badzinski et al. | 128/715 |
| 4,511,886 | 4/1985 | Rodriguez | 340/534 |
| 4,613,845 | 9/1986 | Du Bois | 340/52 |
| 4,718,096 | 1/1988 | Meisel | 379/43 |
| 4,796,292 | 1/1989 | Thomas | 391/91 |
| 4,843,377 | 7/1989 | Fuller et al. | 340/573 |
| 4,862,896 | 9/1989 | Reinhold, Jr. et al. | 128/696 |
| 4,883,064 | 11/1989 | Olson | 128/696 |
| 4,974,607 | 12/1990 | Miwa | 128/904 |
| 4,979,206 | 12/1990 | Padden et al. | 379/67 |
| 4,999,613 | 3/1991 | Williamson et al. | 340/573 |
| 5,023,901 | 6/1991 | Sloan et al. | 379/38 |
| 5,131,038 | 7/1992 | Puhl | 380/23 |
| 5,163,083 | 11/1992 | Dowden et al. | 379/88 |
| 5,172,698 | 12/1992 | Stanko | 128/697 |
| 5,181,237 | 1/1993 | Dowden et al. | 379/88 |
| 5,185,781 | 2/1993 | Dowden et al. | 379/67 |
| 5,280,527 | 1/1994 | Gullman | 380/23 |
| 5,297,194 | 3/1994 | Hunt et al. | 379/88 |

OTHER PUBLICATIONS

IBM Technical Disclosure Bulletin, "Object Access via Fingerprint Recognition on Telephone Keys" vol. 36 Sep. 1993 pp. 13–15.

McGraw-Hill Encyclopedia of Science & Technology (1966) vol. 9., p. 362.

McGraw-Hill Encyclopedia of Science & Technology (1966) vol. 11, pp. 205; 338–340.

*Primary Examiner*—Jeffery Hofsass
*Assistant Examiner*—Thomas F. Presson
*Attorney, Agent, or Firm*—Lowe, Price, LeBlanc & Becker

[57] ABSTRACT

In a switching system for connecting a call between a calling station and a called station, a system and method of voice recognition using a concentrated or distributed multiplicity of voice recognition and other resources with a facility for selecting an initial resource on the calling station going off-hook by sensing an image of the calling party accessing a demographic database and a biometric database using common channel signaling and sensing biometric information regarding the caller, and selecting a prompt to be delivered to the caller from a multiplicity of preselected prompts, and reacting to a response by the caller with further addressing of database information to continue to select from the multiplicity of resources the most appropriate resource or resources in reaction to caller utterances. According to another feature the selection of resources is aided by optical means at the calling station delivering information regarding characteristics of the caller including lip movement to permit lip reading.

42 Claims, 10 Drawing Sheets

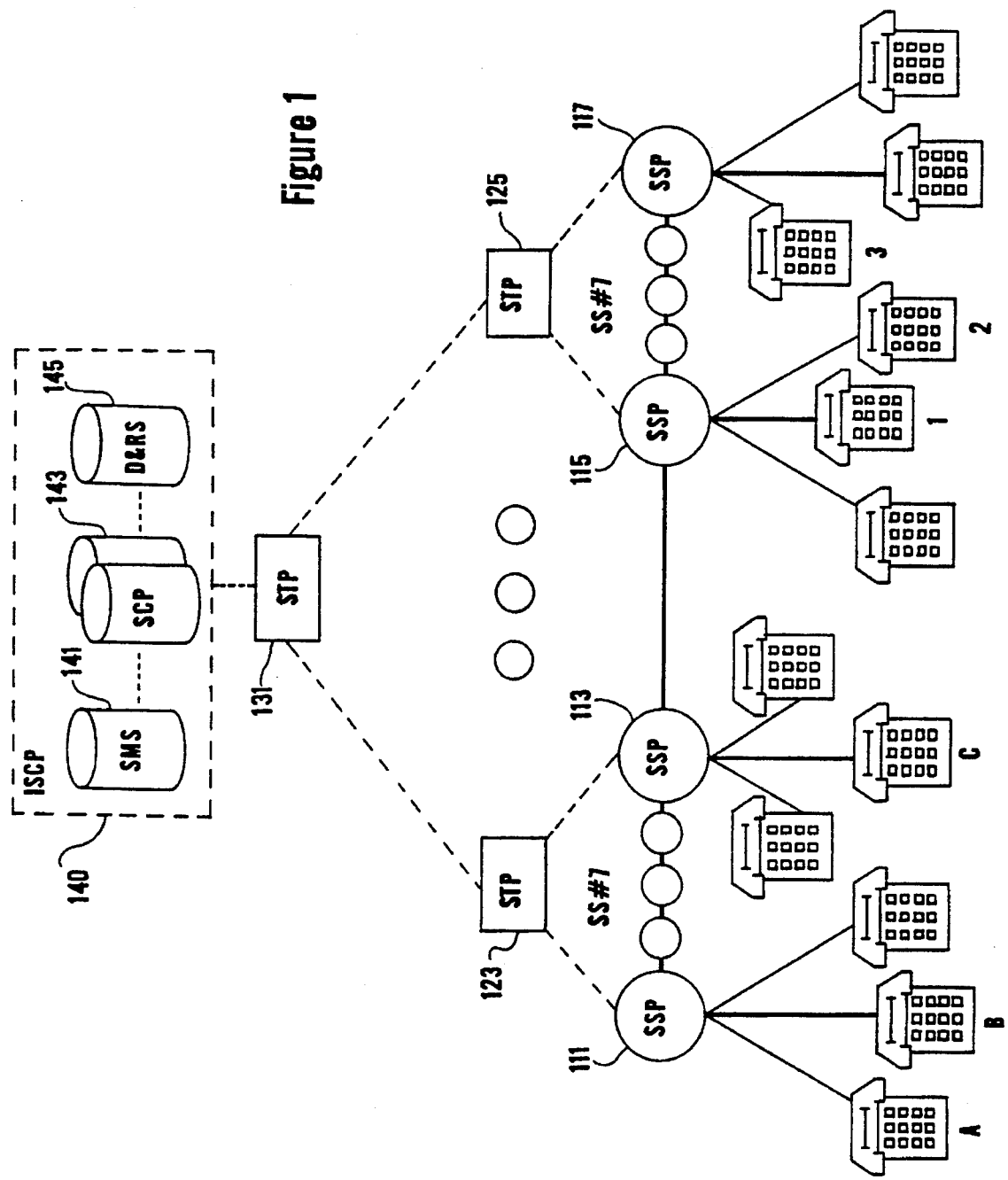

SELECTION OF A VOICE RECOGNITION DATA BASE RESPONSIVE TO VIDEO DATA

RELATED APPLICATIONS

This application is a continuation-in-part of the inventor's applications Ser. No. 08/271,885, filed Jul. 7, 1994, now U.S. Pat. No. 5,553,119 and Ser. No. 08/271,887 filed Jul. 7, 1994.

TECHNICAL FIELD

This invention relates to methods and apparatus for automating various user initiated telephony processes, particularly through the use of improved recognition systems and methodology.

BACKGROUND ART

In the environment of telecommunications systems there has been a steady trend toward automating what was originally operator assistance traffic. Much current activity is directed to responding to directory assistance calls by processing voice frequency instructions from the caller without operator intervention. The instructions are used by an automatic speech recognition unit to generate data signals corresponding to recognized voice frequency signals. The data signals are then used to search a database for a directory listing to derive the desired directory number. A system of this type is described in U.S. Pat. No. 4,979,206 issued Dec. 18, 1990. Further examples of use of voice recognition in automation of telephone operator assistance calls is found in U.S. Pat. No. 5,163,083, issued Nov. 10, 1992; U.S. Pat. No. 5,185,781, issued Feb. 9, 1993; and U.S. Pat. No. 5,181,237, issued Jan. 19, 1993, to Dowden et al.

Another proposed use for speech recognition in a telecommunications network is identity verification by voice verification. This is the process of verifying the person's claimed identity by analyzing a sample of that person's voice. This form of security is based on the premise that each person can be uniquely identified by his or her voice. The degree of security afforded by a verification technique depends on how well the verification algorithm discriminates the voice of an authorized user from all unauthorized users. While it would be desirable to use voice verification to verify the identity of a telephone caller, such schemes to date have not been implemented in a fully satisfactory manner. Illustrative proposals for implementing voice verification are described in U.S. Pat. No. 5,297,194, issued Mar. 22, 1994, to Hunt et al.; U.S. Pat. No. 4,718,096, issued Jan. 5, 1988, to William S. Meisel; U.S. Pat. No. 4,999,613, issued Mar. 12, 1991, to Williamson et al. for a Remote Confinement System; and U.S. Pat. No. 5,023,901, issued Jun. 11, 1991, to Sloan et al., for a Surveillance System.

In the surveillance or home incarceration art, it has also been proposed to use various optical surveillance devices such as cameras. U.S. Pat. No. 4,511,886, issued Apr. 16, 1985, to Michael J. Rodgriguez describes an electronic security and surveillance system. In that system a central monitoring station is connected to a plurality of remote installations or subscribers by a transmission medium having a finite bandwidth. Each remote installation includes a plurality of surveillance equipment, including video, audio, and alarm signals, associated with a plurality of monitored locations. The security information collected by the surveillance equipment is serially sampled by a switcher which provides that information to an interface unit transmitter. The interface unit transmitter compresses the video information and decodes the alarm information and processes the resulting signal for transmission. The information received at the central station is demodulated and the alarm information monitored by means of a command computer.

U.S. Pat. No. 4,458,266, issued Jul. 3, 1984, to Trevor W. Mahoney, describes another surveillance system. The arrangement detects motion by means of a video detector comprising at least one TV camera directed at the surveillance area. The image from the camera is displayed on a TV screen, divided into a matrix of detection zones which are thereafter processed in sequential manner, and the results of the sequential processing compared to earlier scans to detect motion.

U.S. Pat. No. 3,885,090, issued May 20, 1975, to Richard W. Rosenbaum, describes a continuous automatic surveillance system. This system utilizes a video tape recorder to continuously record video images of an area under surveillance on an endless tape loop. When a sensor detects a disturbance the sensor starts an interval timer which stops the video recorder after a predetermined period of time following the disturbance. A plurality of read heads are positioned around the endless tape loop to selectively monitor one of a plurality of past times. By superimposing a grid pattern on the video image and providing predetermined space markings on the floor or wall under surveillance, the movements of a subject may be measured and tabulated to form a motion print characteristic of the subject for later identification.

DISCLOSURE OF THE INVENTION

It is an object of the invention to provide a system and method for accomplishing universal speech recognition on a reliable basis using a unique combination of existing technologies and available equipment.

The new and improved methodology and system involves an initial two step passive and active procedure to preselect the most appropriate technology model or device for each type of caller and for the type of speech which is expected, i.e., digits, alphabet, discourse, etc. The passive feature may be based on numerous factors subject to determination without seeking active participation by the customer or user. One such factor is demographic information which may be determined by identifying the geographic area of origin of the call. This may be accomplished through the use of ANI or Caller ID or any one of a number of other passively determinable factors such as ICLID, DNIC, NNX, area code, time of day, snapshot, date or biometrics. If the profile database constructed for the purpose of making an appropriate choice of recognition technology model or device on the basis of passive features is inconclusive, a second stage or active procedure may be initiated. This may take the form of an automated oral query or prompt to solicit a customer or caller response that can be analyzed to select the appropriate recognition model or device following the caller active step. The nature of the recognition device may be changed during the course of the information exchange with the caller.

In the inventor's above identified parent application Ser. No. 08/271,885, U.S. Pat. No. 5,553,119, it has been disclosed that a factor in obtaining high efficiency speech recognition is that the speech recognition products of different vendors perform more or less satisfactorily under differing specific circumstances. For example, the equipment of one vendor may provide the best performance for continuous digit recognition, the equipment of another vendor may provide the best performance for speaker dependent recognition, the equipment of still another vendor may provide the best performance for speaker independent/word spotting recognition, the equipment of another vendor or different equipment of the same vendor may provide the best performance for male voices or female voices, etc.

As described in that application and related application Ser. No. 08/271,887, both of which are incorporated herein by reference, this seeming limitation may be utilized to advantage by providing a platform (which may be distributed) which includes speech recognition equipment of varying profiles and/or multiple vendors. The recognition task is then handled by directing a specific recognition question to the type of equipment best able to handle that specific situation. Thus an optimal arrangement might incorporate the algorithms of multiple vendors within a single bus architecture so that multiple vendor boards are placed on the main machine and the operating program directs the signal to be recognized to the most appropriate board for processing. Thus that application describes the use of one or more demographic databases to aid or increase the reliability of speech recognition technology.

In the inventor's above identified parent application, Ser. No. 08/271,885 U.S. Pat. No. 5,553,119, there is described an intelligent recognition system and method wherein it is possible to increase the reliability of speech recognition through the use of biometric data or information which can be obtained from the caller both in a passive and active fashion. Such information may be used to provide an indication of the condition, state of anxiety, sobriety or command of mental facilities of the user, and used as an adjunct to determine the nature of prompts or inquiries and the methodology of voice recognition. While the public switched telephone network and radio communication carriers have been used in the past to transmit medical information, including biometric information, this has been for the purpose of providing medical assistance and surveillance. For example, the following patents describe the telephonic transmission of varying types of medical information:

U.S. Pat. No. 5,172,698, issued Dec. 22, 1992, to Bruce E. Stanko; U.S. Pat. No. 4,458,693, issued Jul. 10, 1994, to Hepp et al.; U.S. Pat. No. 4,337,377, issued Jun. 29, 1982, to Van Riper et al.; U.S. Pat. No. 4,883,064, issued Nov. 28, 1989, to Olson et al.; U.S. Pat. No. 4,974,607, issued Dec. 4, 1990, to Satoru Miwa; U.S. Pat. No. 4,862,896, issued Sep. 5, 1989, to Reinhold, Jr. et al.; U.S. Pat. No. 3,870,035, issued Mar. 11, 1975, to Sarnoff; and U.S. Pat. No. 3,742,938, issued Jul. 3, 1973, to Stern.

According to the present invention, an intelligent recognition system and method is provided wherein it is possible to increase the reliability of speech recognition through the use of video information which can be obtained from the caller both in a passive and active fashion. Such information may be used to identify gender, adult versus child, to provide individual identification, in a passive or active manner, either to permit more effective selection of a voice recognition resource or to supplement the recognition reliability of a voice recognition resource otherwise selected. The device and method may be used in a plurality of applications such as directory assistance, call completion, enhanced services, home incarceration, bank card authorization, and credit card authorization, among others.

BRIEF SUMMARY OF THE INVENTION

According to the present invention there is provided a voice recognition platform (which may be distributed), which includes speech recognition equipment of varying types and perhaps of varying vendors. As described in the inventor's aforementioned applications demographic, biometric, and visual feedback may be utilized to improve the efficacy of the recognition system and method. According to the present invention the technology is even further improved using video feedback obtained in either or both passive or active manner. This input is coupled with the availability of a large variety of prompt or dialogue data wherein the video signals interact with the prompt database to attempt to efficaciously utilize the most efficient recognition technology.

The video information provided according to the present invention is preferably obtained utilizing an aimable digital video image sensing device to provide a digital output signal. This signal is compared to previously stored video images in digital memory form to permit group or individual recognition or identification. This may be used both to increase the reliability of intelligent voice recognition or to provide recognition on the basis of the digital data recognition alone. The process is preferably implemented through a telecommunications Advanced Intelligent Network (AIN) using common channel signaling. According to one embodiment of the invention the video identification is effected in an economical and advantageous manner through low definition video image detection combined with stadia-like techniques to permit reliable dimension comparison identification. These techniques may be combined with automatic tracking by the camera device and used in a combinational passive and active methodology which greatly enhances reliability. The system and method permit the creation of a universal validation or accreditation center or bureau which may be used in supplement to or in substitution for existing validation and accreditation devices and methods.

It is accordingly an object of the invention to provide such a system and method for accomplishing universal speech recognition in the environment of a switched telephone network and most particularly a PSTN.

It is another object of the invention to provide a system and method for accomplishing universal speech recognition for purposes of the transfer of spoken intelligence as well as speaker authentication.

It is yet another object of the invention to provide an improved system and method for accomplishing universal speech recognition on an efficient and economic basis using features and technologies which are individually currently available.

It is another object of the invention to provide such a system using a two step passive and active procedure wherein the passive step is transparent to the user and the active step may be transparent to the user with respect to the purpose of the activity.

It is another object of the invention to provide an improved system and method for accomplishing universal speech recognition on a reliable basis using the two step procedure wherein the passive step is at least partially based on biometric data which is unique to the caller and which is sensed using primarily conventional telephone equipment as a platform.

It is another object of the invention to provide an improved system and method for accomplishing universal speech recognition on a reliable basis using the two step procedure wherein the passive step is at least partially based on video data which is unique to the caller.

It is a further object of the invention to provide an improved system and method for accomplishing universal speech recognition on a reliable basis using a combination of passive and active determinations which include detection of behavioral information such as anxiety, anger, inebriation and the like.

It is yet a further object of the invention to provide an improved system and method for accomplishing universal recognition on a reliable basis for use in conjunction with or substitution for current verification or validation methods.

It is another object of the invention to provide an improved system and method for accomplishing universal recognition on a reliable basis using a combination of passive and active determinations which permit effective home incarceration.

It is a still further object of the invention to provide an improved system and method for accomplishing universal recognition on a reliable basis using a combination of sensing techniques including video sensing, but without the necessity for providing a video display.

These and further objects and advantages of the invention will become apparent from the following specification, claims and drawings.

BRIEF DESCRIPTION OF DRAWINGS

FIG. 1 is a block diagram of a typical Advanced Intelligent Network (AIN) system used in the preferred embodiment of the invention in a public switched telephone network (PSTN) as an environment for implementing the invention;

BEST MODE FOR CARRYING OUT THE INVENTION

Figure 5:
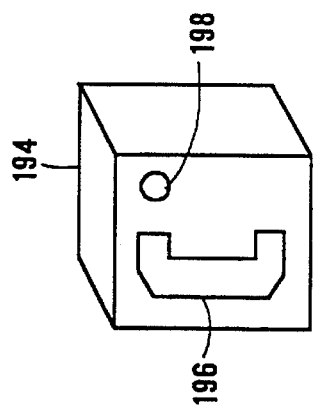
FIG. 5 is a diagrammatic illustration of a public telephone station equipped with a camera lens which acts as a sensor to provide additional passively obtained information.

Referring to FIG. 1 there is shown a typical AIN equipped switched telephone network which provides the preferred implementation for the invention. In the system shown in FIG. 1, each of the central office switching systems are labeled as an "SSP." The Service Switching Points, referred to as SSP's, are appropriately equipped programmable switches present in the telephone network, which recognize AIN type calls, launch queries to the ISCP and receive commands and data from the ISCP to further process the AIN calls.

As shown in FIG. 1, all of the central office switches are equipped and programmed to serve as SSP's. Such central office switching systems typically consist of a programmable digital switch with CCIS communications capabilities. One example of such a switch is a 5ESS type switch manufactured by AT&T; but other vendors, such as Northern Telecom and Siemens, manufacture comparable digital switches which could serve as the SSP's. A 5ESS type switch is illustrated and described in above described U.S. Pat. No. 4,979,206. While the network illustrated in FIG. 1 shows all central offices functioning as SSP's other AIN implementations provide the SSP functionality only at selected points in the network, and end offices without such functionality forward calls to one of the SSP's.

The SSP's 111 and 113 connect to a first local area STP 123, and the SSP's 115 and 117 connect to a second local area STP 125. The connections to the STP's are for signaling purposes. As indicated by the black dots below STP's 123 and 125, each local area STP can connect to a large number of the SSP's. The central offices or SSP's are interconnected to each other by trunk circuits (illustrated in FIG. 1 as bold lines) for carrying telephone services.

The local area STP's 123 and 125, and any number of other such local area STP's shown as circles between STP's 123 and 125, communicate with a state or regional STP 131. The state or regional STP 131 in turn provides communications with the ISCP 140. The STP hierarchy can be expanded or contracted to as many levels as needed to serve any size area covered by the Advanced Intelligent Network (AIN) and to service any number of stations and central office switches. The links between the central office switching systems and the local area STP's 123 and 125 are typically SS7 type CCIS interoffice data communication channels. The local area STP's are in turn connected to each other and to the regional STP 131 via a packet switched network. The regional STP 131 also communicates with the ISCP 140 via a packet switched network.

The above described data signaling network between the SSP type central offices and the ISCP is preferred, but other signaling networks could be used. For example, instead of the CCIS links, STP's and packet networks, a number of central office switches and an ISCP could be linked for data communication by a token ring network. Also, the SSP capability may not always be available at the local office level, and several other implementations might be used to provide the requisite SSP capability.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional messsage formats, for example a format for a subsequent query from the SSP, and formats for "INVOKE" messages for instructing the SSP to play an announcement or to play an announcement and collect digits.

As shown in FIG. 1, the ISCP 140 is an integrated system. Among other system components, the ISCP 140 includes a Service Management System (SMS) 141, a Data and Reporting System (D&RS) 145 and the actual database referred to as a Service Control Point (SCP) 143. The ISCP also typically includes a terminal subsystem referred to as a Service Creation Environment or SCE (not shown) for programming the data base in the SCP 143 for the services subscribed to by each individual business customer.

Although shown as telephones in FIG. 1, the terminals can comprise any communication device compatible with the line. Where the line is a standard voice grade telephone line, for example, the terminals could include facsimile devices, modems, credit card validation terminals, etc.

Each central office switching system or SSP normally responds to a service request on a local communication line connected thereto, for example an off-hook followed by dialed digit information, to selectively connect the requesting line to another selected local communication line. The connection can be made locally through only the connected central office switching system. For example, for a call from station A to station B the SSP 111 provides the call connection without any connection to another central office. When the called line connects to a distant station, for example when station A calls station C, the connection is made through the connected central office switching system SSP 111 and at least one other central office switching system SSP 113 through the telephone trunks interconnecting the two central office switches.

In CCIS type call processing the local central office suspends the call and sends a query message through one or more of the STP's. The query message goes to the central office to which the called station is connected, referred to as the "terminating" central office; for example, for a call from station A to station C the query would go from originating SSP 111 to terminating SSP 113. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends ringback tone back through the connection to the calling station.

In an Advanced Intelligent Network (AIN) type system, such as shown in FIG. 1, certain calls receive specialized AIN type processing under control of data files stored in the SCP database 143 within the ISCP 140. In such a network, the SSP type local offices of the public telephone network detect a call processing event identified as an AIN "trigger." For ordinary telephone service calls, there would be no event to trigger AIN processing; and the local and toll office switches would function normally and process such calls as discussed above, without referring to the SCP database for instructions. An SSP office which detects a trigger, however, will suspend call processing, compile a TCAP formatted call data message and forward that message via a common channel interoffice signaling (CCIS) link and STP(s) to the ISCP 140 which includes the SCP database 143. If needed, the ISCP can instruct the central office to obtain and forward additional information. Once sufficient information about the call has reached the ISCP, the ISCP accesses its stored data tables to translate the received message data into a call control message and returns the call control message to the office of the network via CCIS link and STP(s). The SSP then uses the call control message to complete the particular call through the network. The present invention allows a subscriber to interact with the SCP database maintained in the ISCP, to control the implementation of the intelligent recognition of the invention.

Figure 2:
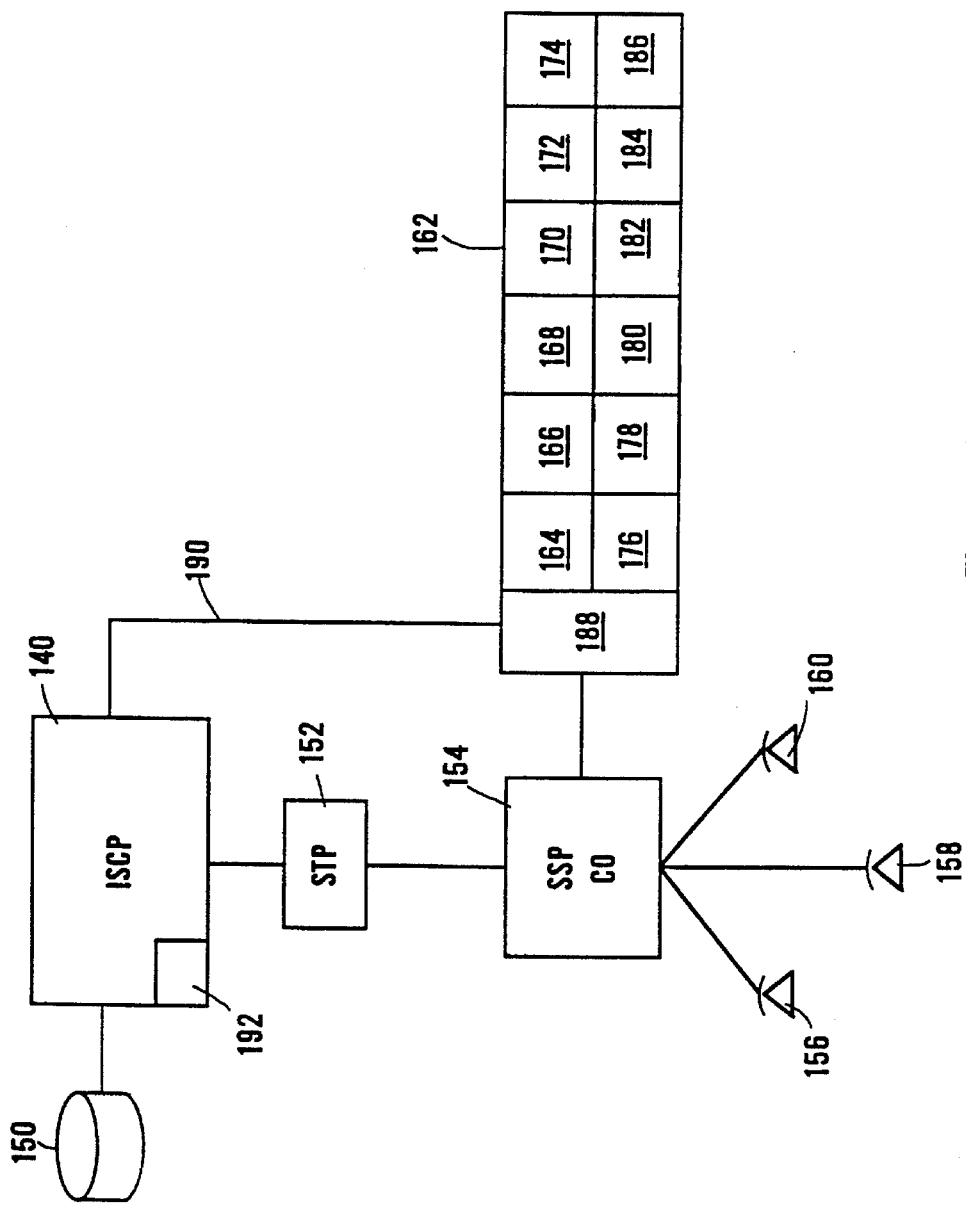
FIG. 2 is a schematic block diagram illustrating a platform for implementing the invention according to one embodiment.

Referring to FIG. 2 the ISCP 140 is connected in the general architecture illustrated in FIG. 1 to one or more STP's 152 and to an SSP and central office 154. The central office 154 may be connected to telephone stations 156–160 and to other central offices and/or SSP's as generally illustrated in FIG. 1. The switching office 154 may be considered to be generally similar to that described in U.S. Pat. No. 4,479,206. According to the invention there is connected to a voice and data switching network and to the control in the switching office 154 a multi-board voice recognition platform 162. The voice recognition platform 162 preferably provides an open bus architecture, such as the standard EIA bus, to which are connected multiple resources indicated at 164–186, fed by a front end 188. The resources associated with the platform 162 may be concentrated as shown in FIG. 2 or may be distributed and connected by a suitable LAN.

Resources 164–186 preferably constitute voice recognition devices or "boards" having different capabilities or efficiencies in handling specific recognition situations. That is, the resources may provide varying degrees of reliability under differing circumstances. For example, one board or device may provide the most reliable recognition of numbers or digits, another may provide high reliability for recognizing letters of the alphabet, another may provide high reliability in a specific limited vocabulary, still another may provide high reliability with respect to specific ethnically accented English, another may provide high reliability with respect to the slurred speech of an inebriated person, another may provide high reliability for a specific gender, etc. It will be understood that these devices are constructed in a known manner by creating the desired templates based on empiric sampling of the desired speech models. Still other resources may be devoted to different languages, it being a feature of the invention that automation may indicate the preferability of requesting the caller to use his/her native language. Other resources may be devoted to authentication and verification. Thus resources can be provided for speaker dependent recognition on a general vocabulary basis or speaker dependent recognition of words, passwords or numbers. An open bus architecture platform of this general nature is presently provided by VoicePlex Corporation of Irving, Tex. The product name is VoicePac. The platform 162 is connected to the ISCP 140 through data link 190 to provide ISCP control thereof.

The ISCP may be used to perform virtually all of the control functions of the front end 188 or, in the alternative, the ISCP participation may be minimized by utilizing an intelligent peripheral as the front end. Also, the audio response unit and voice processing unit incorporated in the switching office of the Padden et al. U.S. Pat. No. 4,979,206 may be included in an intelligent front end 188. With control provided by either the ISCP and/or the front end or intelligent peripheral, the resource platform provides interaction which is not limited to the initial selection of a resource but which may also continually select between the different resources dependent upon control signals dictated by the point in the transaction (PICT). Thus different resources may be called into use dependent upon the expected use of digits, alphabet, speaker recognition, password recognition, etc. Illustrative suppliers of voice recognition resources include Texas Instruments, Northern Telecom, Dialogic, Voice Processing Corporation (VPC), and others.

A selection may be driven not only by the nature of the recognition problem but also by behavioral aspects of a given transaction. Thus the state of anxiety of a speaker may be judged by the pitch of the voice. Generally speaking an increase in anxiety rate is usually indicated by an increase in voice pitch. The ISCP or intelligent peripheral on detecting such a change may dictate selection of a different appropriate resource.

According to the present invention there is provided still additional sensing of mental and physical condition of a caller to permit proactive passive reaction of the system to biometric parameters. Such parameters may also be used actively to permit even more accurate assessment of and reaction to the condition of a caller. This not only permits more reliable voice recognition but also makes it possible to provide early emergency assistance.

The selection process reaction to the control signals from the ISCP or intelligent peripheral in addition to selecting the appropriate resource also selects the schedule of prompts (instructions or inquiries).

If the database constructed for the purpose of making the appropriate resource choice on the basis of passive features is inconclusive, a second or active step procedure may be initiated. In an illustrative example this occurs where the passive procedures carried out under the control of the ISCP or intelligent peripheral indicate that the recognition result is insufficiently certain. In that event the ISCP or intelligent peripheral sends a signal to initiate a prompt in the form of a query to solicit user response that can be analyzed to aid in the resource selection process. The inquiry may solicit a response which will provide a sample of speech aimed particularly at categorizing the user. The particular word or words of speech would be selected for that purpose and may not be truly germane to the call but used strictly for recognition purposes. For example, the passive analysis may provide an inconclusive indication of the native language of the speaker. This result may be used to trigger an inquiry to the caller requesting a "yes" or "no" confirmation of that tentative conclusion. The inquiry itself may be couched in the tentatively selected language if the degree of certainty reaches a predetermined point. If the caller confirms the identity of the language the controller (ISCP or intelligent peripheral) can then dictate the selection of the appropriate resource for that language as well as the schedule of prompts. Thus a two-fold selection is made.

In addition to the foregoing the present invention permits the passive results to trigger a request for the speaking of a word or phrase which will permit a deep breath test for sobriety or inebriation as well as the degree thereof.

Figure 3:
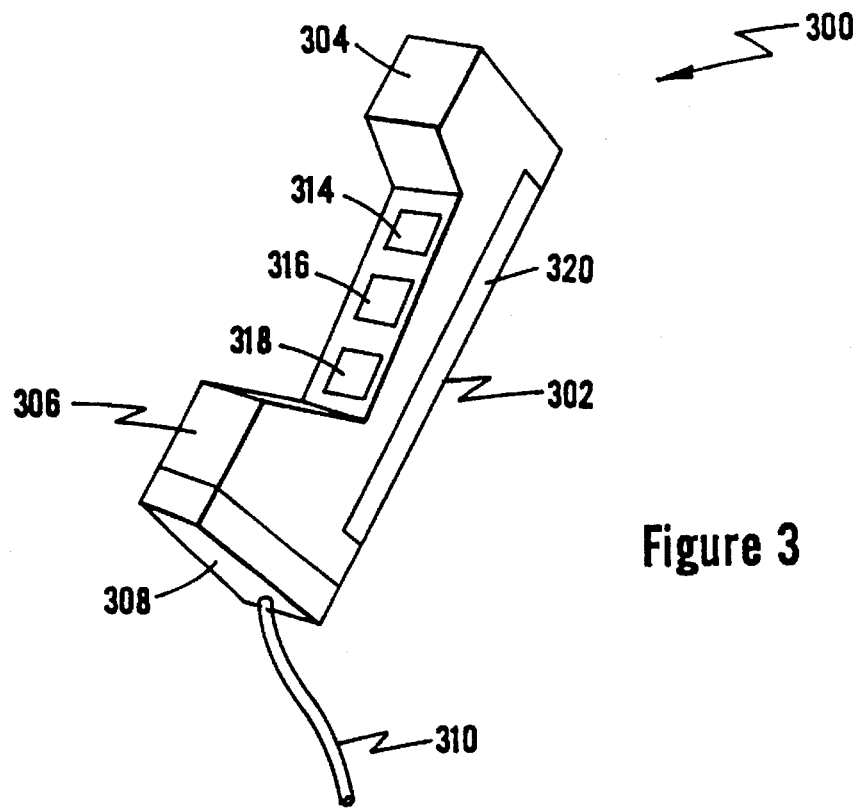
FIG. 3 is a perspective view of a handset having biometric sensors for use in the invention.

According to FIG. 3 there is shown a telephone handset 300 which includes biometric sensing apparatus. The handset has the conventional handle portion 302, ear piece 304 and mouth piece 306. Affixed to the mouth piece, either separately or integrally is a breath tester 308 which is aesthetically designed to be as unobtrusive as possible. The conventional handset cable 310 includes not only the normal network connections but also all connections to the biometric sensing devices. The breath tester is specifically designed to test for the presence of alcohol and may comprise a modified Alert Model J-4 which is commercially available and manufactured by Alcoholic Countermeasure Systems, Inc. of Mississiauga, Ontario, Canada. The breath tester 308 includes an alcohol sensor such as a Figaro Engineering Co. Model TGS109 Tin Oxide Semiconductor Gas Sensor which measures the alcohol content of the sample.

The microcircuitry for translating the sensed signal into a digital signal is included within the tester 308 which produces a digital output signal to provide a measure of the alcohol content of the breath of the handset user. The invention comprehends that the breath testing may be of both a passive and active type with the former occurring without specific instructions to the caller and the latter involving a request that the caller either pronounce specifically selected words to provide a deep breath sample or that the caller deeply exhale for this purpose. Other exemplary breath testing arrangements suitable for incorporation into the device are described in U.S. Pat. Nos. 3,764,270, 3,842,345, 3,809,067, 3,903,726, 4,093,945, 4,613,845, 4,843,377.

The signal outputted by the breath tester 308 is connected to the head end 188 to supply an additional factor to aid in profiling the identity and condition of the caller. In cases of extreme inebriation the alcohol level sensed passively by the breath detector provides a proactive warning and supplies an additional passive aid in profiling the caller. The head end 188 may be suitably programmed to react to an extreme level of inebriation by immediate connection to a live operator for active communication with the caller to complete the call if feasible, to advise the caller that the call cannot be completed, or in extreme circumstances to initiate a 911 alert to either or both an emergency assistance service or police. In the case of lesser degrees of inebriation the passive breath testing stage may aid in selecting a previously prepared inebriation templet designed to aid in recognition and interpretation of callers in varying degrees of inebriation. The platform 162 may be provided with one or more templets of this type tailored to aid in deciphering conversations with inebriated callers having various types of accents and/or vocabularies. If it is deemed desirable the operator may request the caller to speak words preselected to produce a deep breath sample or request the caller to deeply exhale. Alternatively, automated prompts may be provided for this purpose in automated reaction to the sensing of predetermined levels of inebriation prior to switching the call to a live operator.

Where the invention is being utilized in a home incarceration or confinement capacity and the confined person has a history or alcoholism it is possible to prepare and provide speaker dependent, inebriation dependent voice recognition templates. The breath testing may trigger the use of a series of prompts intended to request the incarcerated caller to speak specific words which were previously utilized in the preparation of templates designed to aid in detecting the degree of inebriation. The speaker dependent voice verification template can be used to verify that the user or caller is continuing to personally speak and has not attempted to have another submit to the active inebriation test.

Figure 4:
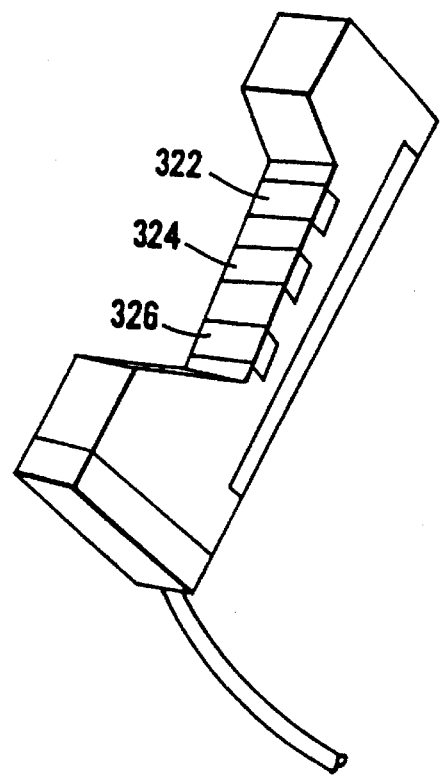
FIG. 4 is a perspective view of another embodiment of a handset having integral biometric sensors.

In addition to the breath tester 308, the handset 300 is provided with a series of electrodes 314, 316, 318, and 320 (and an electrode corresponding to electrode 320 on the opposite side of the handset not visible in FIG. 3). The electrode 320 is elongated and may be configured to extend completely around the rear side of the handset to the opposite side to act as a common electrode which is virtually certain to be contacted by the hand of the handset user. The electrodes 314, 316 and 318 are provided as spaced electrodes intended for contact with distinct fingers of the user. According to another embodiment, these electrodes may also extend around the handset in the manner illustrated at 322, 324 and 326 in FIG. 4. The spaced and separate electrodes provided in this manner are effective to provide pulse, blood pressure, and EKG information in a known manner as described, for example, in U.S. Pat. No. 5,172,698.

The electrodes are preferably mounted on the handset in such a manner as to be as unobtrusive as possible, for example, to appear as aesthetic decoration. Alternatively, the form of the entire telephone station may be stylized so that the appearance of the electrodes creates the impression of decoration rather than scientific instrumentation. With such an arrangement it is possible to conduct at least limited biometric tests in a passive manner without or prior to the initiation of active profiling steps on an interactive basis with the caller. The results of such tests serve as an aid in profiling the condition, state of mind, state of anxiety and the like, of the caller. Such information may be utilized by the head end or the ISCP to factor into the process of selecting the optimal available voice recognition device or combination of such devices. In the case of home incarceration the same information may be subjectively profiled to the incarcerated individual and used as an added means of ensuring reliability of identification. As previously described in connection with the breath detector, it is also possible to utilize the information from the biometric sensors in extreme conditions as a means of sensing the desirability of summoning emergency medical assistance.

In addition to the foregoing, the telephone station may be provided with available optical or camera fittings to permit lip reading to produce a second signal with added intelligence to supplement that obtained from the audio response. Digital cameras are available for this purpose and can provide a digital signal subject to decoding in a decoder located at any suitable site such as with the resource platform or the ISCP. The speech recognition process may then be based on the parallel outputs of resources reading the audio and video signals. Such a decoder is indicated diagrammatically at 192 in the ISCP 140. A telephone station having such a camera is shown in FIG. 5 wherein the station is indicted at 194, the handset at 196, and the camera at 198.

Figure 6:
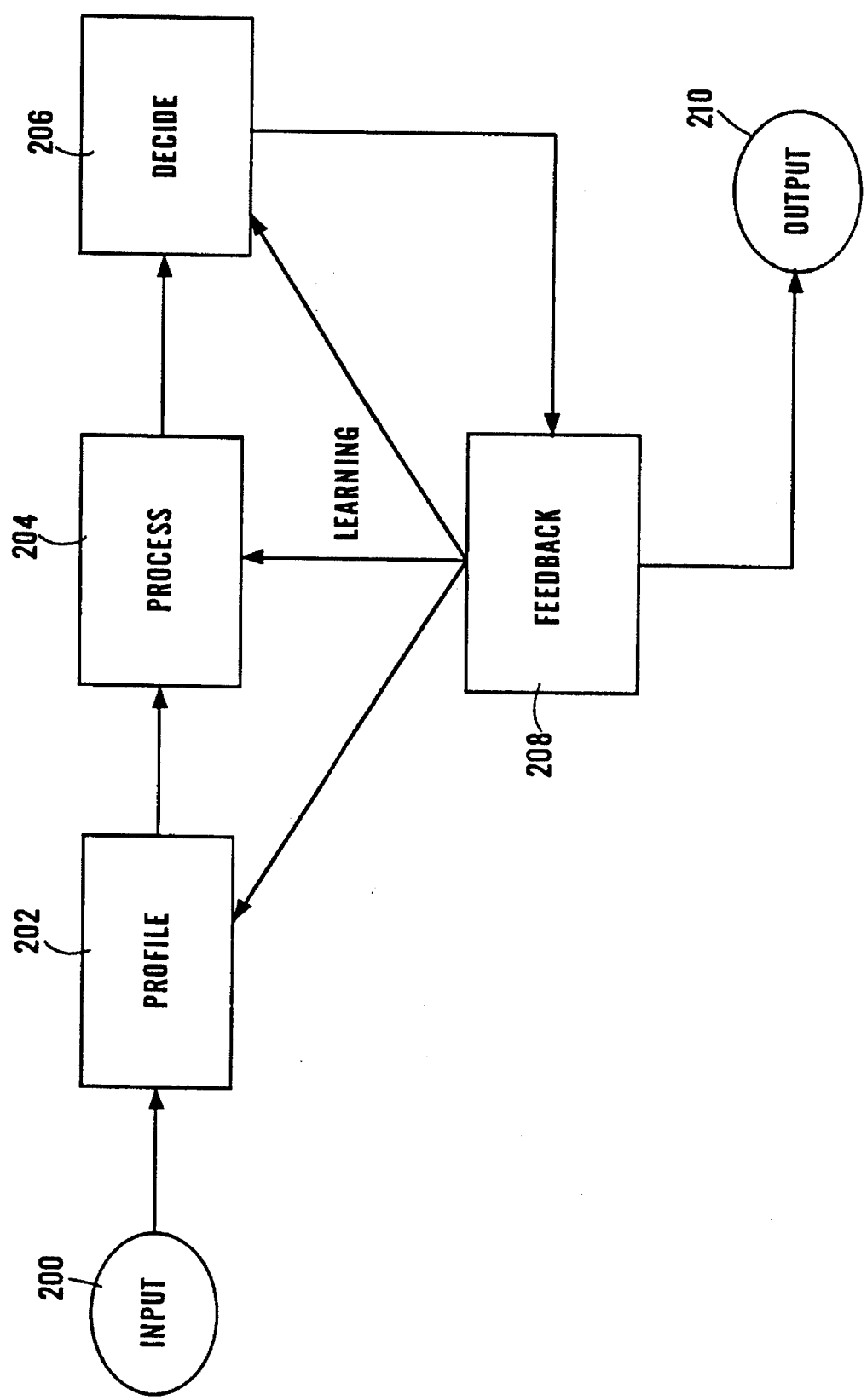
FIG. 6 is a high level process flow diagram for the intelligent recognition system of the invention.

Referring to FIG. 6 there is shown a high level process flow for the intelligent recognition system of the invention. The caller input is indicated at 200. Initially the simple lifting of the handset creates an off-hook condition and may initiate biometric sensing. The profile step is shown at 202 and the recognition process at 204. The decision (tentative or final) occurs at 206 which may result in feedback at 208 in a closed loop fashion to ultimately provide the resulting output data signal at 210.

Figure 7:
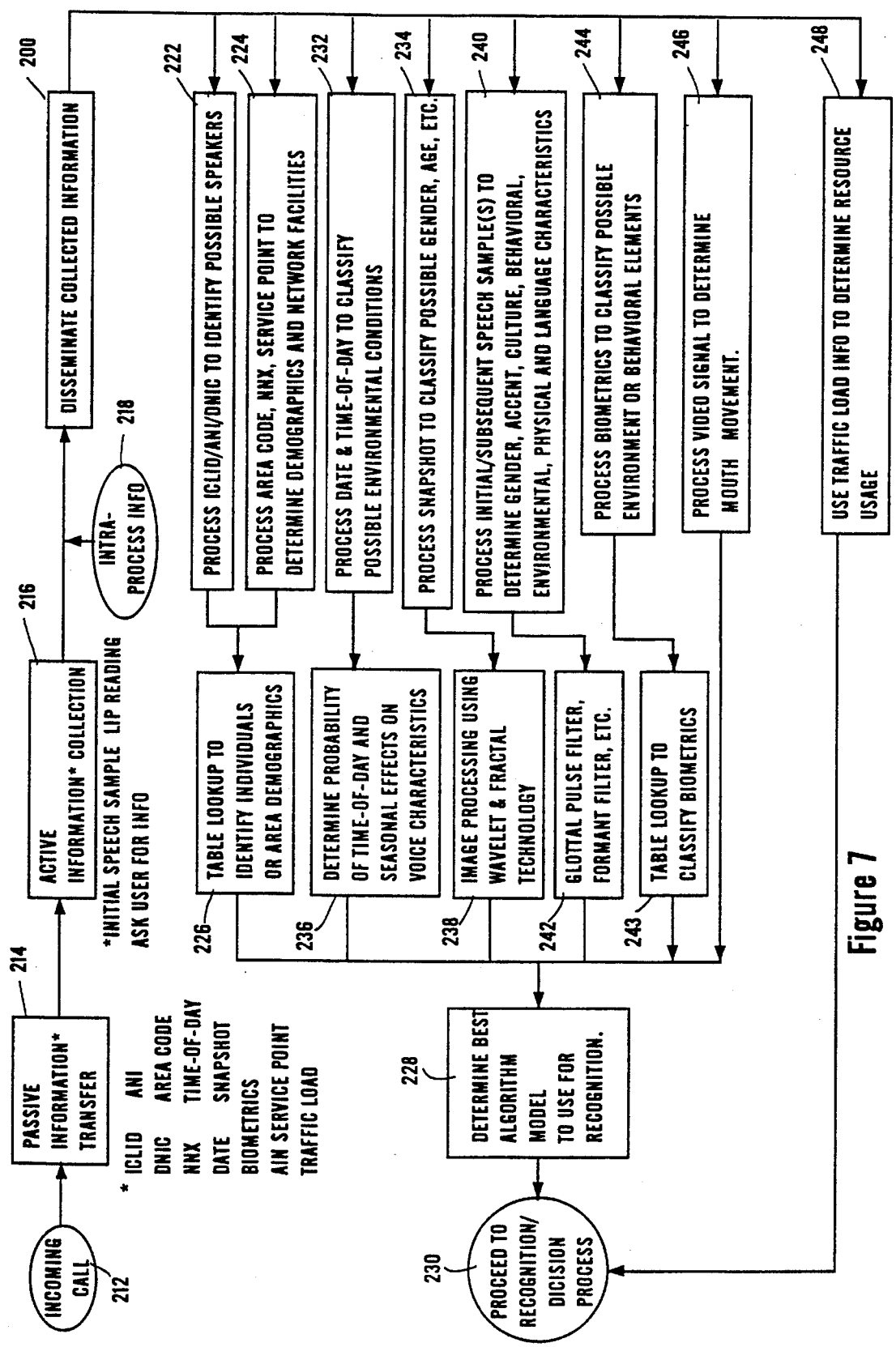
FIG. 7 is a process flow diagram illustrating the profiling procedure.

FIG. 7 illustrates the profiling process flow. Thus the incoming call is shown at 212, passive information transfer at 214, active information collection at 216, intra-process information at 218, and dissemination of collected information at 220. Collected information such as the identity of the calling station obtained via ICLID, ANI or DNIC is processed at 222. In the case of residential subscribers this may identify the speaker. Similarly, identification may be via the area code, NNX, or service point indicated as being processed at 224 to identify demographic data. Other collected information such as biometric input may be processed at 244. The profiling inputs 222 and 224 are fed to the lookup table or database as indicated at 226 to determine the best demographically selected algorithm model or resource to use for recognition as shown at 228. The biometric profiling inputs 244 are fed to the lookup table or database indicated at 243 to determine the best biometrically selected algorithm or resource as shown at 228. This results in the selection of the algorithm or combination of algorithms being utilized to conclude the recognition process and generation of the output signal at 230.

Other factors which may be utilized in a profiling procedure are the date and time of day to classify possible environmental conditions indicated at 232, and the output of the camera indicated at 234. These are processed at 236 and 238 respectively to provide further input into the determination of the best algorithm model at 228. Such processing may be serial or parallel as previously described. Other factors which may aid in selecting the optimal resource include the determination of gender, accent, culture, behavioral, environmental, physical and language characteristics indicated at 240 and processed at 242. Still further variables capable of being sensed and utilized in the procedure are biometrics indicated at 244 and processing of the video signals as in lip reading indicated at 246. The sensing of traffic load information to determine the degree of resource usage is indicated at 248 and provides assistance in determining whether low traffic load and resource utilization would permit parallel resource use.

Figure 8:
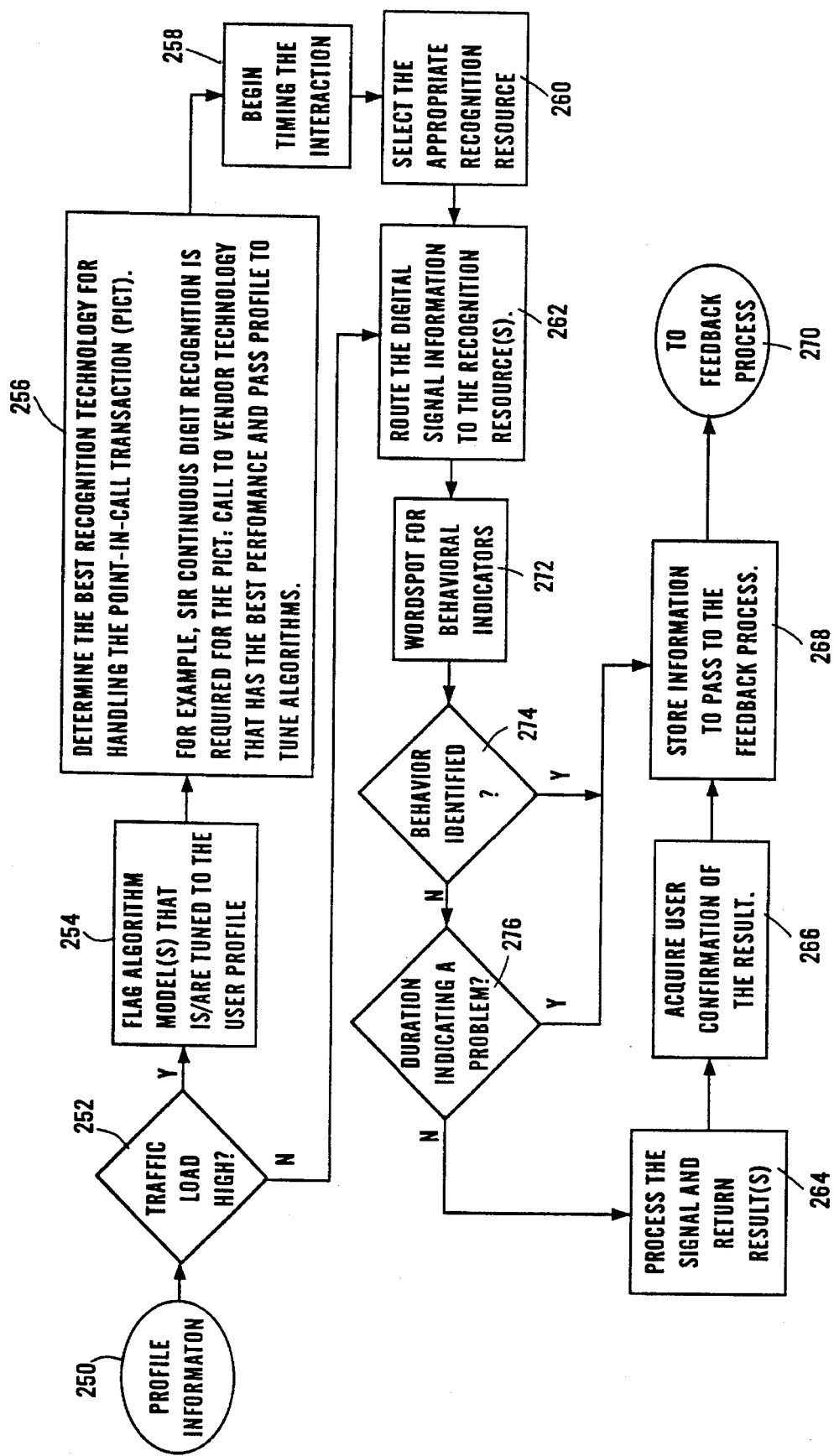
FIG. 8 is a flow diagram illustrating interaction in the process flow of the intelligent recognition system.

The interaction process is shown in flow diagram form in FIG. 8. Referring to that figure the profile information which results from the profiling process flow of FIG. 7 is indicated at 250. At 252 a determination is made as to whether the traffic load higher or lower than a predetermined level. If the level is too high, the appropriate initial resource or algorithm is selected at 254. At 256 further determination is made as to the best recognition technology for handling the point-in-call transaction (PICT), i.e., the specific intelligence being delivered at that time or point in the call. Thus if the PICT involves digit recognition the optimal resource for that process is selected. At 258 the processing using the initial resource commences and timing begins with actual selection occurring at 260. The signal is routed to the selected resource at 262. Ignoring the behavioral determination steps for the time being, the signal from the resource is processed and the results provided at 264. The confirmation of the user may be obtained at 266 through the use of appropriate prompts, and information stored at 268 to pass to the feedback process at 270.

The behavioral determination steps are indicated at 272, 274 and 276. Thus at 272 a suitable database is utilized to spot or recognize preselected words indicative of anxiety or other behavioral status. These may be words such as "damn", "dammit" or other indications of annoyance or agitation, or words such as "please" indicating a pleasant disposition. On spotting such words in a suitable word recognition resource, a determination may be made at 274 as to whether a particular behavior can be identified. If this occurs at 274 a signal is passed into the feedback process at 268. This may result in a change in the series of prompts then used with the caller or may result in directing the call to an operator. If the behavior determination step at 274 is indeterminate and the process continues, a further determination point is reached at 276 as to whether the time of processing, which began at 258, has progressed to the point where a problem is indicated. If this occurs there is a signal to the feedback processes at 268 which triggers an appropriate reaction, such as possible referral to a live operator.

Figure 9:
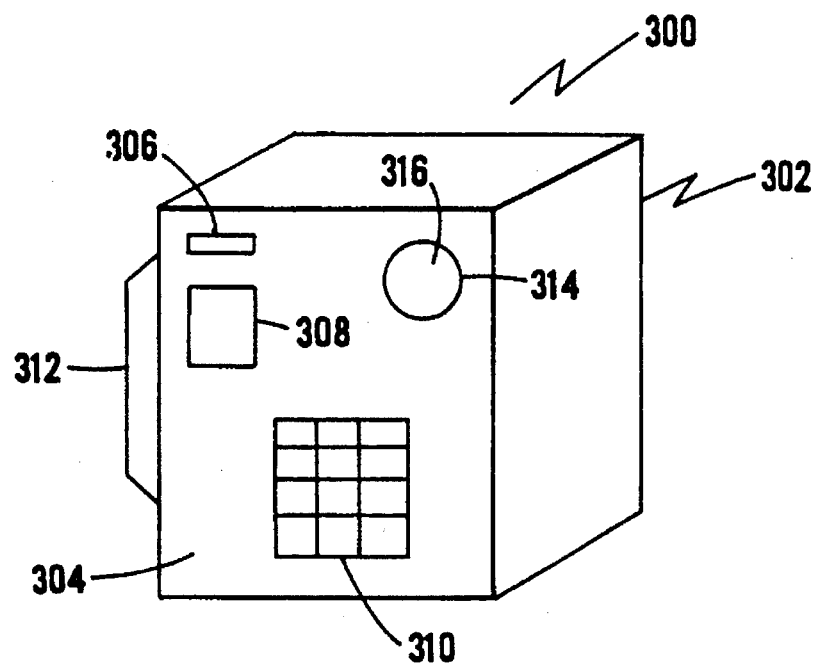
FIG. 9 is a perspective view of a public toll telephone instrument constructed to one embodiment of the invention.

Referring to FIG. 9 there is shown a public toll telephone station generally indicated at 300. The station 300 has a suitable housing 302 having a front face or panel 304.

Figure 10:
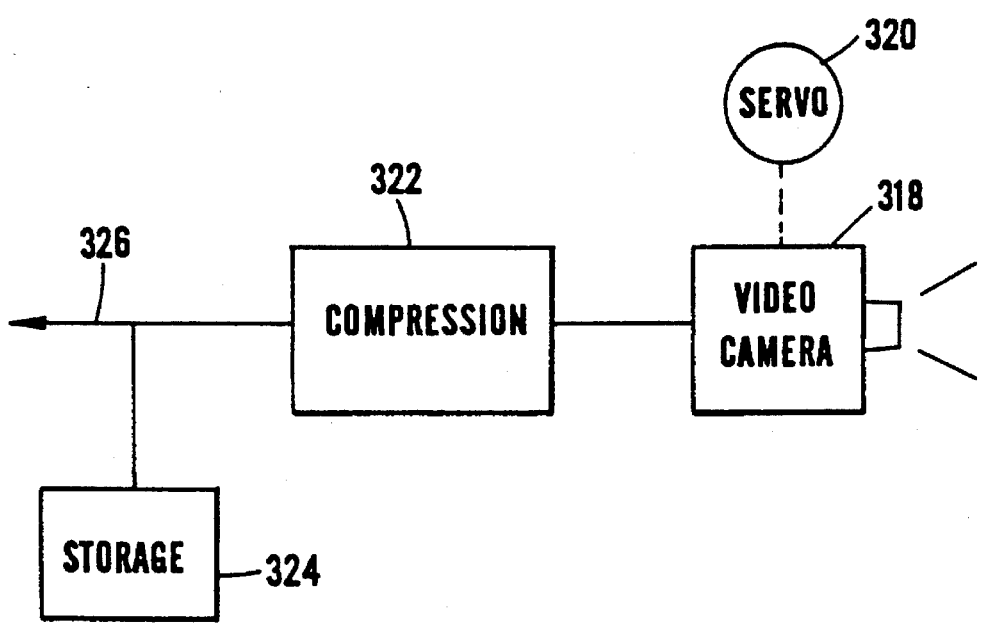
FIG. 10 is a block diagram of the arrangement of a video camera for the telephone station.

Mounted on the front panel 304 are a coin slot 306 and coin return 308. A conventional touch tone pad is shown at 310. A handset 312 is suspended from the side of the telephone casing by a suitable switch hook (not shown). Provided in the front panel of the toll station 300 is a video port 314 which may be covered with a transparent protective lens 316. Behind the lens 316 is mounted an aimable video camera 318 seen in FIG. 10. The camera 318 may be aimed or driven by a suitable servo mechanism 320. The video servo arrangement is preferably of the universal motion type described in U.S. Pat. No. 3,988,533, issued Oct. 26, 1976, to Mick et al., for a Video-Type Universal Motion and Intrusion Detection System.

According to a preferred embodiment of the invention it is possible to utilize a video camera of rudimentary type for comparing spatial and temporal energy patterns received from an energy radiating or reflecting body, or, more specifically, for comparing digital representations of images. Such devices are particularly useful in determining identify or "sameness" between an image being compared and a pre-stored image in the form of digital signals. In a complete recognition situation the image detected will be identical to an initially recorded and digitally stored reference image. One type of such a sensing device is described in U.S. Pat. No. 3,617,016 to Bolsey, issued Nov. 2, 1971, and in U.S. Pat. No. 3,932,703, issued Jan. 13, 1976, to Bolsey. Inasmuch as there is no need to reproduce images from the electrical signals provided by the sensing device, scanning apertures larger than usual are permissible, particularly in the direction perpendicular to the momentary direction of scan. The device can operate with relatively low illumination and/or be equipped with relatively low-sensitivity photo-transducers, which are generally less costly than high sensitivity devices. Such a digital camera is capable of producing a digital signal of 400 KB which may be put through a compression algorithm as indicated at 322 to provide a 4–5 KB signal for easy transmission through the Public Switched Telephone Network (PSTN). The digital signal may be temporarily buffered or stored at a storage 324 in the telephone station prior to read-out to the network at 326 as a data signal. The equipment in the telephone station may be powered from SPTN battery thereby eliminating the need for providing local station power.

Figure 11:
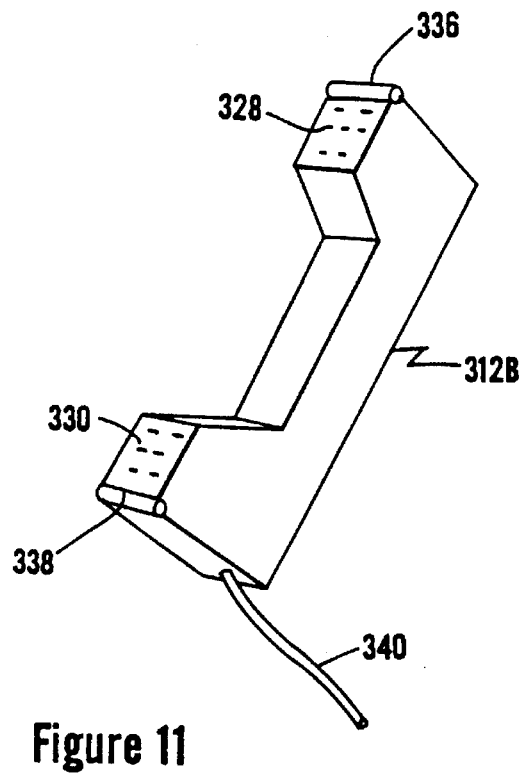
FIG. 11 is a perspective view of one embodiment of a handset for the telephone station of FIG. 9 showing the stadia indices or benchmarks.
Figure 12:
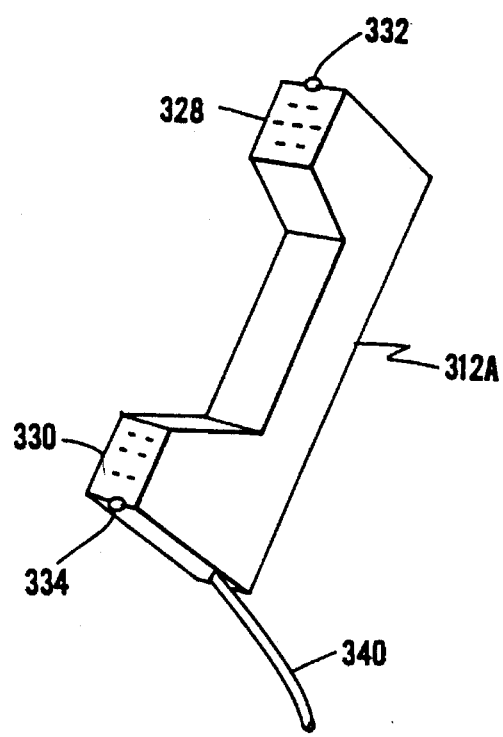
FIG. 12 is a perspective view of another embodiment of a handset for use with the telephone instrument illustrating a different type of stadia indices or benchmarks.

Referring to FIGS. 11 and 12 there are shown two embodiments of the handset 312. Thus, in FIG. 12 there is shown a handset 312A having a mouthpiece 328 and earpiece 330. Provided on the edges of the mouthpiece 328 and earpiece 330 are sources of electromagnetic radiation in the form of protruding bulbs 332 and 334, which may be in the form of LED's emitting visible or infrared light. In the embodiment shown in FIG. 11 the handset 312B is again provided with a mouthpiece 328 and earpiece 330. However in this instance the radiation sources are shown as rods 336 and 338 which again may be LED's emitting visible or infrared radiation. The advantage of the rod-like radiators 336 and 338 is their visibility from a larger sector of radiation. Both handsets 312A and 312B are provided with conventional connecting cords 340 which contain all necessary conductors for handling the audio communications as well as the powering of the radiation sources.

The purpose of the radiators mounted on the mouthpiece and earpiece of the handset is to provide signal sources which are spaced a known distance to provide a benchmark against which to judge relative prominent features of the head of a caller for detection and registration by the sensing device or video camera. Such stadia methods of measurement are known in range finding and other applications. See, for example, "McGraw-Hill Encyclopedia of Science and Technology", 1966, Vol. 11, pages 338–340. The radiation sources 332 and 334 are preferably utilized as targets for tracking of the handset by the optical sensing device or video camera and may be implemented in any suitable conventional manner such as described in the previously referenced U.S. Pat. No. 3,988,533, or as utilized in automatic radar tracking (see, "McGraw-Hill Encyclopedia of Science and Technology", 1966, Vol. 11, page 205) or tracking telescopes (see, "McGraw-Hill Encyclopedia of Science and Technology", 1966, Vol. 9, page 362).

With the known range of the distance between the stadia or radiators on the handset it is possible to obtain a relative measurement of features such as the distance from the end of a nose, the top of lips, between eyes, from ear to ear, to hairline, etc., for identification purposes. In the event that the caller turns in such a manner as to hide the radiators from the camera a prestored audio prompt can be triggered requesting the caller to face the telephone instrument.

The video device generates a digital signal representing an image of the user of greater or lesser definition depending upon the nature and purpose of the installation. Where the application is that of assisting voice recognition in an automated attendant capacity for establishing a call without the necessity of digital input, the degree of definition is lesser than that required where home incarceration and more positive identification is the purpose of the installation. In the lower definition category, the image represented may be an outline which permits discernment of characteristics subject to relatively straight-forward predetermination. Such is the case for gender or adult/child discrimination. A slightly greater degree of definition may be desired where it is sought to test the degree of match to preestablished dimensions or ratios. In such a case there are created and stored templates or data representing such parameters as eye spacing compared to ear spacing, hairline to nose dimension compared to nose to lips dimension, or the almost infinite permutations and combinations of the foregoing which may be established. Such parameters may be utilized to realize a relatively high degree of identification capability without requiring a high definition imaging or the more sophisticated recognition facilities which would be required.

It is an advantage of the invention that a comprehensive intelligent recognition is provided wherein reliability can be predicated on a conclusion based on a combination of different parameters without requiring costly high accuracy in any single parameter. Thus the invention provides a recognition which may be based upon a combination of such diverse factors as demographic, biometric, video, and behavioral data, both passively and actively obtained to select from a plurality of speech recognition and other resources which may be employed in serial or in parallel, with or without feedback, to provide a cumulatively integrated recognition of not only speech but also appearance. The available resources are used singly and in combination in an optimal configuration determined not only by the overall purpose of the procedure but by the requirements of the particular point-in-call transaction (PICT).

The system and methodology provides a versatility which provides the capability of facilitating a wide variety of processes and services. Thus in addition to those previously mentioned, enhanced services in the nature of improved call blocking may be provided. A subscribing household containing adults and children and desiring to block access of the children, or of specific ones of the children, to predesignated telephone numbers or transactions may be profiled on an individual basis. This provides a high degree of recognition for the specific situation requiring a decision as to whether a specific call in a specified site is to be completed or blocked. A database may be preestablished containing templates representing any one or more of a desired number of parameters, such as male/female, adult/ child, speech, behavioral, or biometric data. The database may be maintained at any convenient site in the network, such as the SCP, the head end of the recognition platform, a selected switching office, or an independent intelligent peripheral or the like. The process may be initiated when the telephone station goes off-hook. The identity of the household is then established by common channel signaling using ANI, ICLID or the like. The thus determined directory number is then checked against a service database to determine whether or not the calling station is a subscriber to the particular service. If the calling station is determined to be a subscriber, as signified via AIN or common channel signaling using the SCP, passive recognition is initiated. In the case of a family, the preestablished database will contain information as to the number of members, their age, gender and authorizations. Based on the identification of the specific caller and the number which is inputted by the caller, either via keyboard or voice, the SCP or intelligent peripheral makes a determination as to whether or not a particular call from the particular caller is permitted and signals the end office using common channel signaling. The call may then be completed, or if denied, a suitable prompt or prestored audio statement delivered to the caller. Other enhanced services may also be accomplished by the system and methodology of the invention.

Figure 13:
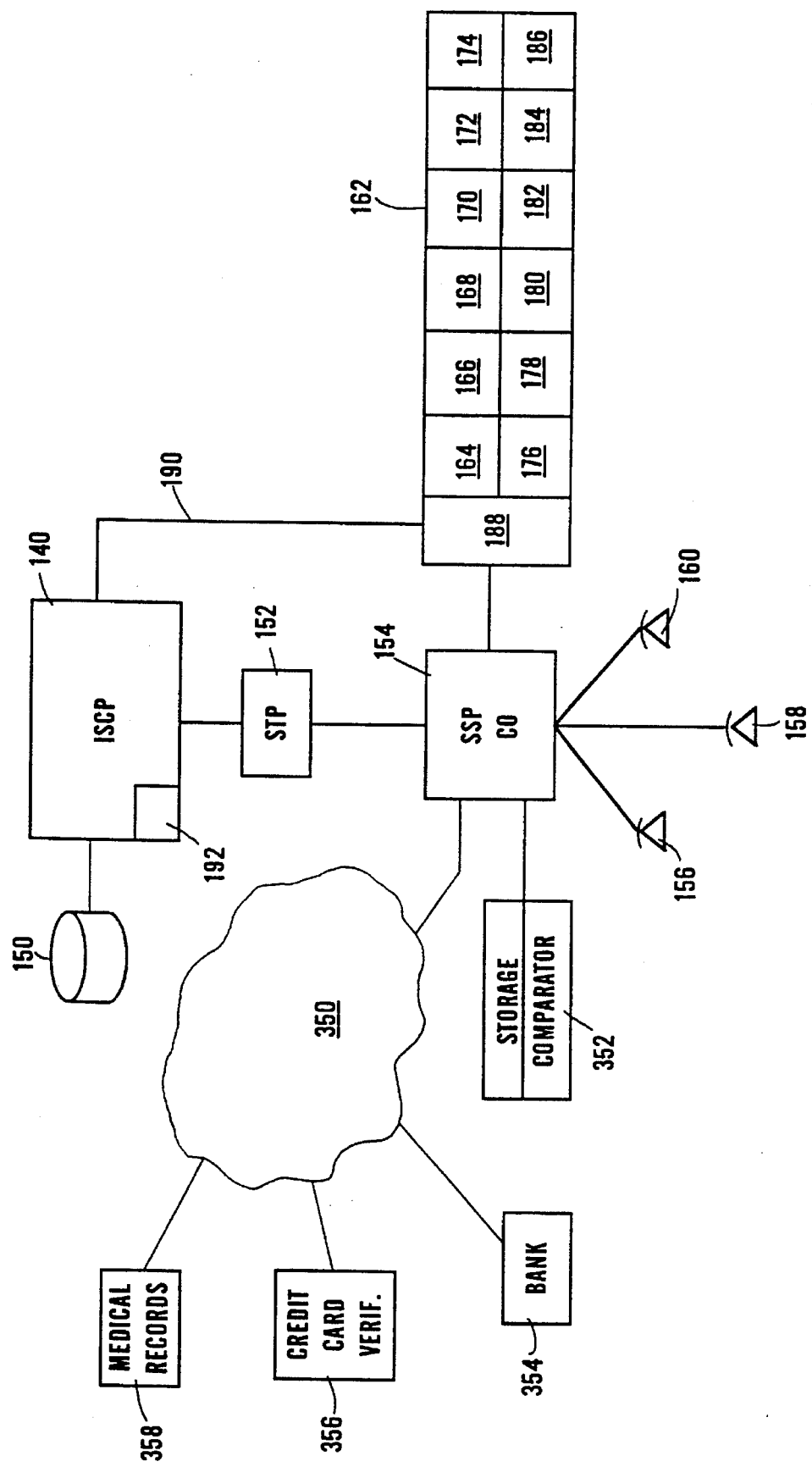
FIG. 13 is a block diagram showing the connection of the system in a public switched telephone network.

Referring to FIG. 13 a typical platform for the system is shown as a variation on that previously described in conjunction with FIG. 2. The same reference numerals have been applied in referring to elements previously described. In FIG. 13 it is illustrated that the end office or SSP 154 for subscribers 156–160 is connected to the PSTN represented by the cloud 350. In this particular embodiment the database for the above described subscriber profiles for enhanced services are provided at 352. This includes storage for the profile database and a comparator to provide comparison and a recognition conclusion using conventional microprocessor facilities. Also connected to the PSTN 350 are other installations or facilities such as bank facilities 354, credit card verification facilities 356 and medical storage facilities 358. According to the invention the network storage/comparator 352 may contain its own authorization database relating to all subscribers to the service for implementing a preliminary or final identification procedure to make a decision to admit or deny to a specific caller accreditation for accessing bank records and facilities, credit card authorization for purchases, or access to medical records. This network authorization may serve as a substitute for or an adjunct to existing accreditation and verification services, such as, for example, those described in detail in U.S. Pat. No. 4,796,292, issued Jan. 3, 1989, to Jerry S. Thomas and assigned to American Express Co. of New York, or the services described in detail in U.S. patent application Ser. No. 07/959,920 filed Oct. 14, 1992, and assigned to the assignee of the instant application.

From the foregoing it may be seen that the invention provides an architecture and method for using known individual devices and processes for implementing an approach to universal intelligent recognition, including speech recognition, with a high degree of reliability. Such an ability renders the methodology applicable to a wide range of applications not only in processing PSTN services but also to such diverse problems as effective home incarceration.

This is effective utilizing a two-step passive and active procedure wherein the passive step is completely transparent to the user and the active step may be transparent to the user at least partially with respect to the activity. The architecture of the system includes an intelligent recognition platform containing multiple recognition resources having varying abilities so as to provide an instantaneous choice of the most appropriate resource for the type of recognition involved.

Figure 14:
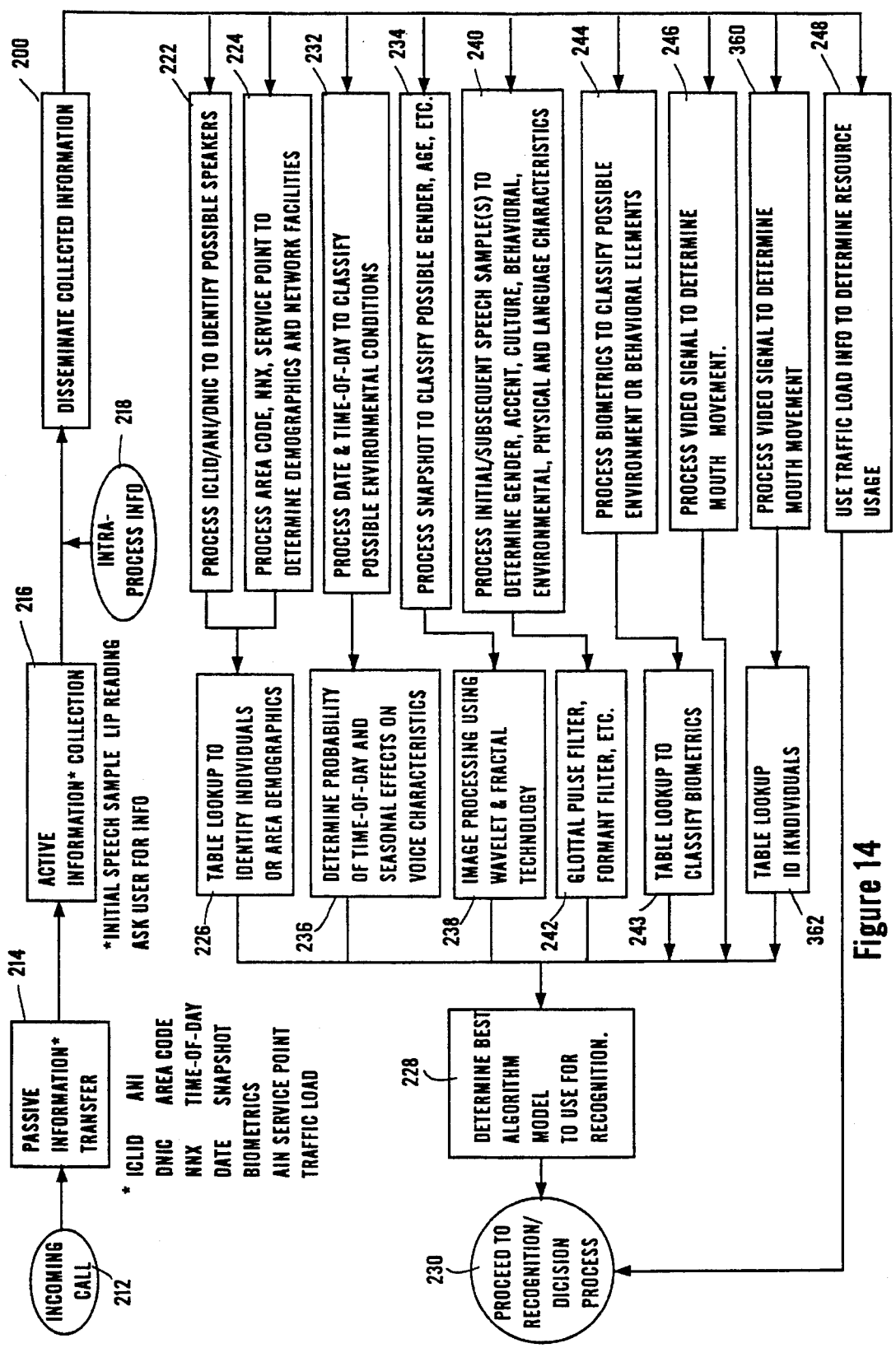
FIG. 14 is a flow diagram illustrating interaction in the process flow of the intelligent recognition system.

Referring to FIG. 14, there is seen a profiling process flow chart similar to that described in FIG. 7 but with the video image processing to identify the caller shown at 360. The table look-up to identify individuals is indicated at 382.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A switching system including interconnected switching offices and stations connected to at least certain of said switching offices and a Common Channel Signaling System (CCSS) for controlling the connection of a calling station to a called station through said switching system;

a plurality of speech recognition resources connected to said switching system;

a calling station having a handset and having means associated therewith responsive to said calling station going off-hook for sensing an image and outputting a video signal containing information representative of said detected image;

a database associated with said CCSS having stored therein data corresponding to pre-established image information;

comparing means for comparing selected portions of the information represented by said digital signal with corresponding information in said database containing said data corresponding to pre-established image information and providing a signal representative of the degree of match;

means responsive at least partially to said degree of match to select at least one of said resources and to connect a signal from said calling station to said selected resource; and means associated with said plurality of resources for outputting a signal responsive to a spoken command inputted to said calling station.

2. A switching system according to claim 1 including:

stadia means mounted on said handset at a predetermined distance apart for detection by said image sensing means to establish a known distance and provide a reference for establishing other distances represented in the image signal outputted by said sensing means.

3. A switching system according to claim 2 wherein said stadia means comprise radiation means.

4. A switching system according to claim 3 wherein said radiation means are mounted on said handset in a manner to protrude from at least one surface thereof to provide visibility from multiple directions including a direction parallel to said surface.

5. A switching system according to claim 2 wherein said image sensing means includes focusing means arranged to focus on said stadia means.

6. A switching means according to claim 5 wherein said image sensing means includes aiming means arranged to aim said image sensing means at said stadia means.

7. A switching means according to claim 2 including:

means for sensing loss of a direct line of sight between said image sensing means and said stadia means and for initiating a trigger signal to cause delivery to the handset of an audio prompt advising the user to face the station.

8. A switching system according to claim 1 including:

a database associated with said CCSS having stored therein biometric information;

means for addressing said database and accessing information therein in response to a caller holding said handset off-hook and sensing biometric input;

means responsive to said accessed information to at least partially contribute to the selection of at least one of said resources and to connect a signal from said calling station to said selected resource.

9. A switching system according to claim 1 including audio response means for generating a plurality of predetermined audio responses, wherein said audio response means generates an audio response responsive to said signal responsive to said spoken command.

10. A switching system according to claim 9 wherein said audio response requests a further spoken command from said calling station and including means associated with said plurality of resources for outputting a signal responsive to outputs from at least a pair of said resources operating in parallel.

11. A switching system according to claim 1 wherein said handset has mounted thereon sensing means for sensing biometric parameters and generating signals responsive to the parameters sensed; and means for rendering the signal outputted by said plurality of resources at least partially responsive to said signals responsive to parameters sensed.

12. A switching system according to claim 1 including:

an operator station;

timing means;

means for initiating timing by said timing means at a pre-determined occurrence after said calling station goes off-hook;

means establishing a pre-determined time duration for timing by said timing means; and means responsive to said timing means reaching said pre-determined time duration to cause connection of said calling station to said operator station.

13. A switching system according to claim 1 including:

a database associated with said CCSS having stored therein demographic information related to said stations connected to said switching stations;

means for addressing said database in response to a station going off-hook to access demographic information relating to said off-hook station;

means responsive to said accessed information to supply input to the selection of at least one of said resources and to connect a signal from said calling station to said selected resource for outputting a signal responsive to a spoken inputted command to said calling station.

14. A switching system according to claim 13 including audio response means for generating a plurality of predetermined audio responses, wherein said audio response means generates an audio response responsive to said signal responsive to said spoken command.

15. A switching system according to claim 14 wherein said audio response invites a further spoken command to said calling station, and including means associated with said plurality of resources for outputting a signal responsive to outputs from at least a pair of said resources.

16. A switching system including interconnected switching offices and stations connected to at least certain of said switching offices and a Common Channel Signaling System (CCSS) for controlling the connection of a calling station to a called station through said switching system;

a plurality of recognition resources connected to said switching system;

a calling station having a handset and having means associated therewith responsive to said calling station going off-hook for sensing an image and outputting a video signal containing information representative of said detected image;

a database associated with said CCSS having stored therein data corresponding to pre-established image information;

comparing means for comparing selected portions of the information represented by said digital signal with corresponding information in said database containing said data corresponding to pre-established image information and providing a signal representative of the degree of match;

means responsive at least partially to said degree of match to select at least one of said resources and to connect a signal from said calling station to said selected resource; and means associated with said plurality of resources for outputting a signal responsive to a spoken command inputted to said calling station.

17. A switching system according to claim 16 including:

stadia means mounted on said handset at a predetermined distance apart for detection by said image sensing means to establish a known distance and provide a reference for establishing other distances represented in the image signal outputted by said sensing means.

18. A switching system according to claim 17 wherein said stadia means comprise radiation means.

19. A switching system according to claim 18 wherein said radiation means are mounted on said handset in a manner to protrude from at least one surface thereof to provide visibility from multiple directions including a direction parallel to said surface.

20. A switching system according to claim 17 wherein said image sensing means includes focusing means arranged to focus on said stadia means.

21. A switching system according to claim 20 wherein said image sensing means includes aiming means arranged to aim said image sensing means at said stadia means.

22. A switching means according to claim 17 including:

means for sensing loss of a direct line of sight between said image sensing means and said stadia means and for initiating a trigger signal to cause delivery to the handset of an audio prompt advising the user to face the station.

23. A switching system according to claim 16 including:

a database associated with said CCSS having stored therein biometric information;

means for addressing said database and accessing information therein in response to a caller holding said handset off-hook and sensing biometric input;

means responsive to said accessed information to at least partially contribute to the selection of at least one of said resources and to connect a signal from said calling station to said selected resource.

24. A switching system according to claim 16 including audio response means for generating a plurality of predetermined audio responses, wherein said audio response means generates an audio response responsive to said signal responsive to said spoken command.

25. A switching system according to claim 24 wherein said audio response requests a further spoken command from said calling station, and including means associated with said plurality of resources for outputting a signal responsive to outputs from at least a pair of said resources operating in parallel.

26. A switching system according to claim 16 wherein said handset has mounted thereon sensing means for sensing biometric parameters and generating signals responsive to the parameters sensed; and means for rendering the signal outputted by said plurality of resources at least partially responsive to said signals responsive to parameters sensed.

27. A switching system according to claim 16 including:

an operator station;

timing means;

means for initiating timing by said timing means at a pre-determined occurrence after said calling station goes off-hook;

means establishing a pre-determined time duration for timing by said timing means; and means responsive to said timing means reaching said pre-determined time duration to cause connection of said calling station to said operator station.

28. A switching system according to claim 16 including:

a database associated with said CCSS having stored therein demographic information related to said stations connected to said switching stations;

means for addressing said database in response to a station going off-hook to access demographic information relating to said off-hook station;

means responsive to said accessed information to supply input to the selection of at least one of said resources and to connect a signal from said calling station to said selected resource for outputting a signal responsive to a spoken command inputted to said calling station.

29. A switching system according to claim 28 including audio response means for generating a plurality of predetermined audio responses, wherein said audio response means generates an audio response responsive to said signal responsive to said spoken command.

30. A switching system according to claim 29 wherein said audio response invites a further spoken command to said calling station, and including means associated with said plurality of resources for outputting a signal responsive to outputs from at least a pair of sensors.

31. In a switching system including interconnected switching offices and stations having handsets connected to at least certain of said switching offices, a Common Channel Signaling System (CCSS) for controlling the connection of a calling station to a called station through said switching system, and a plurality of recognition resources connected to said switching system; a method comprising the steps of:

responsive to a calling station going off-hook, sensing an image in a field of view adjacent to said calling station and generating a video signal containing information representative of said detected image;

comparing said information from said digital signal with prestored data corresponding to pre-established image information, and providing a signal representative of the degree of match;

at least partially responsive to said degree of match selecting at least one of said resources and connecting a signal from said calling station to said selected resource;

responsive to a spoken command from said calling station outputting from said plurality of resources a signal representative thereof.

32. A method according to claim 31 including the steps of:

providing on said handset of said calling station stadia means mounted a pre-determined distance apart and detecting said stadia means by an image sensing means to establish a known distance and provide a reference for establishing other distances represented in the image signal outputted by said sensing means.

33. A method according to claim 32 including the step of providing radiation from said stadia means for detection by said image sensing means.

34. A method according to claim 33 including the step of providing said radiation from said stadia means in at least two mutually perpendicular planes over sectors of a least 270 degrees in each plane.

35. A method according to claim 32 including the step of focusing said image sensing means on said stadia means.

36. A method according to claim 32 including the step of aiming said image sensing means at said stadia means.

37. A method according to claim 32 including the steps of:

sensing loss of a direct line of sight between said image sensing means and said stadia means; and delivering to the handset of said calling station an audio prompt advising the user to face the station.

38. A method according to claim 31 including the steps of:

storing in a database associated with said CCSS biometric information;

addressing said database and accessing biometric information therein in response to a caller holding said handset at said calling station off-hook; and selecting at least one of said resources and connecting a signal from said calling station to said selected resource at least partially on the basis of said biometric information.

39. A method according to claim 31 including the steps of:

storing a plurality of pre-determined audio responses; and delivering to said calling party one of said prestored audio responses in response to said spoken command.

40. A method according to claim 39 including the steps of:

requesting a further spoken command from said calling station; and delivering to said calling party an audio signal responsive to outputs from at least a pair of said resources operating in parallel.

41. A method according to claim 31 including the steps of:

timing the call commencing with the off-hook condition; and connecting said calling station to an operator station at the termination of a pre-determined interval.

42. A method according to claim 31 including the steps of:

establishing a database associated with said CCSS having stored therein demographic information related to said stations connected to said switching stations;

addressing said database in response to a station going off-hook to access demographic information relating to said off-hook station;

responsive to said accessed demographic information supplying input to the selection of at least one of said resources; and connecting a signal from said calling station to said selected resource for outputting a signal responsive to a spoken command to said calling station.

* * * * *